Figure 1:
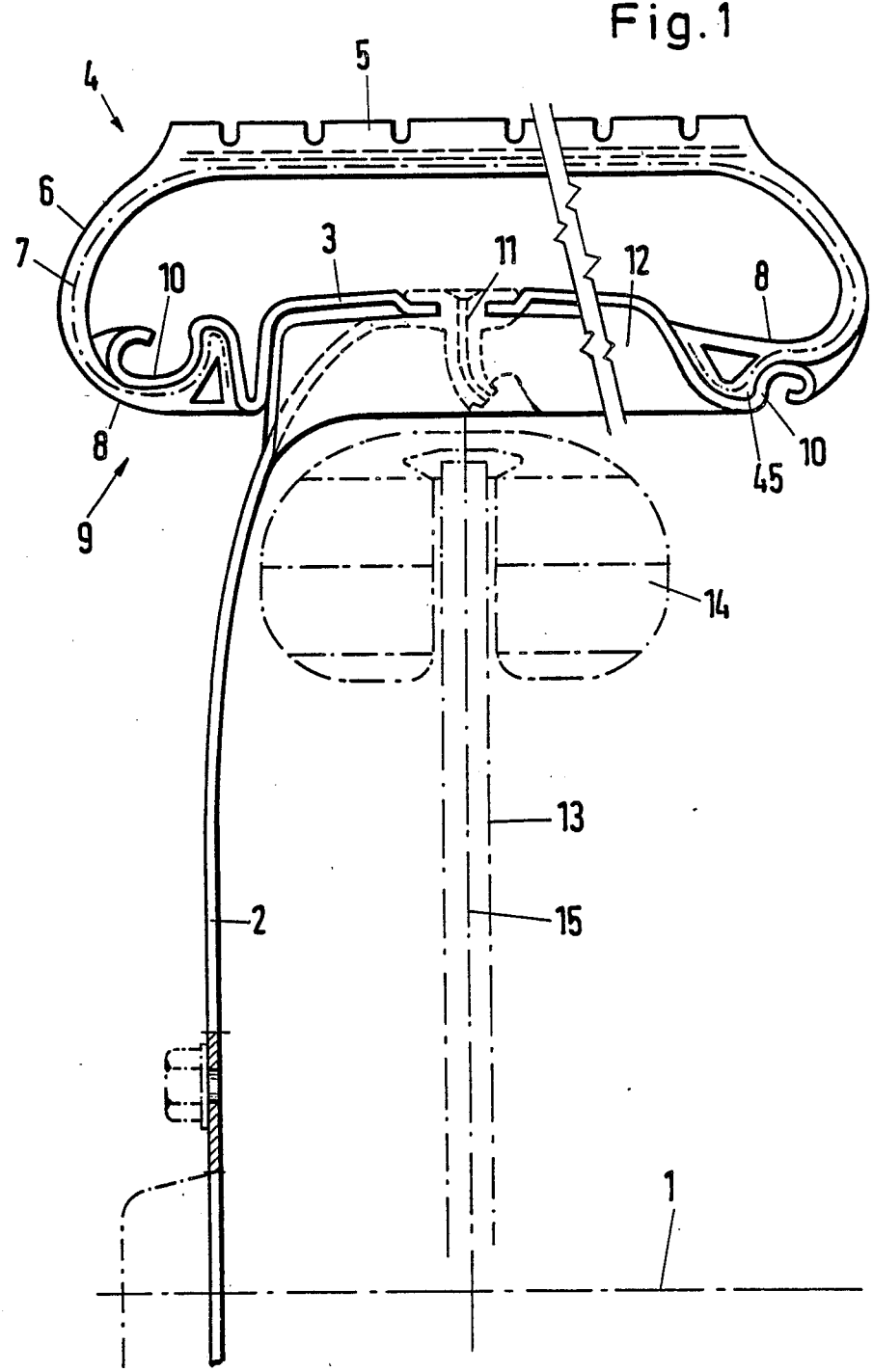

United States Patent [19]
Debus

[11] Patent Number: 4,892,129
[45] Date of Patent: Jan. 9, 1990

[54] TIRE UNIT AND PROCESS FOR MANUFACTURING SAME

[76] Inventor: Klaus Debus, Am Schwarzen Moor 13, 2070 Ahrensburg, Fed. Rep. of Germany

[21] Appl. No.: 116,568
[22] PCT Filed: Jan. 12, 1987
[86] PCT No.: PCT/EP87/00011
§ 371 Date: Sep. 16, 1987
§ 102(e) Date: Sep. 16, 1987
[87] PCT Pub. No.: WO87/04395
PCT Pub. Date: Jul. 30, 1987

[30] Foreign Application Priority Data

Jan. 17, 1986 [DE] Fed. Rep. of Germany ....... 3601316

[51] Int. Cl.$^4$ .................... B60C 15/036; B29D 30/20
[52] U.S. Cl. ................... 152/516; 152/379.5; 152/541; 156/95
[58] Field of Search .............. 152/379.3, 379.5, 380, 152/541, DIG. 20, 344, 516, 520; 156/401, 412, 95, 132, 398, 135, 136

[56] References Cited

U.S. PATENT DOCUMENTS

| | | | |
|---|---|---|---|
| 4,087,306 | 5/1978 | Head et al. | 152/132 X |
| 4,563,042 | 1/1986 | Seitz et al. | 152/380 X |
| 4,572,262 | 2/1986 | Entmayr et al. | 152/379.3 X |
| 4,577,668 | 3/1986 | Seitz et al. | 152/379.3 X |
| 4,635,697 | 1/1987 | Rach et al. | 152/379.5 X |
| 4,662,418 | 5/1987 | Janus | 152/380 |
| 4,696,333 | 9/1987 | Rach et al. | 152/379.3 |
| 4,732,198 | 3/1988 | Frerichs et al. | 152/379.5 X |

FOREIGN PATENT DOCUMENTS

| | | | |
|---|---|---|---|
| 2409177 | 9/1975 | Fed. Rep. of Germany ... | 152/379.3 |
| 3206171 | 8/1983 | Fed. Rep. of Germany . | |
| 3343890 | 6/1985 | Fed. Rep. of Germany . | |
| 1234567 | 11/1960 | France . | |
| 2030087 | 4/1980 | United Kingdom ............. | 152/379.5 |

Primary Examiner—Raymond Hoch
Attorney, Agent, or Firm—Chilton, Alix & Van Kirk

[57] ABSTRACT

A tire unit consisting of a coreless air tire (4), containing a reinforcing ply (7), and a rim (3), the edges (8, 10) of which are permanently connected to one another solely by bonding. The part of the tire edge (8) containing the reinforcing ply is bonded to the latter only on one side of the rim. The rim edge (10) has an undercut (28) in which the tire edge (8) contains an annular reinforcement (29). A main bonding zone (23, 37) is provided in the undercut or adjacent to it on the outside. In the main bonding zone, the tangential angle (25) to the axis (1) is at no point (24) smaller than at each point which lies closer to the tire side wall (6) or smaller than the angle (20) at which the tire side wall (6) runs clear of the rim under all normal loading conditions. Moreover, a process is proposed for producing such a tire unit.

19 Claims, 8 Drawing Sheets

TIRE UNIT AND PROCESS FOR MANUFACTURING SAME

The invention relates to a tire unit consisting of a coreless air tire, containing a reinforcing ply, and a rim, the edges of which are connected to one another by bonding, with additional means being provided for securing the connection. The invention also relates to a manufacturing process.

In practice, only such wheels whose tires and rims are separable elements are used for motor vehicles. The forces acting in the meridional section in the peripheral direction of the tire are absorbed by the core arranged in the bead of the tire so that they do not need to be transmitted to the rim. The core makes tire manufacture more difficult. Moreover, this system has the disadvantage that the rim shape is predetermined with regard to the tire seating and no design latitude is left for purusing other purposes, for example the emergency running capacity. Tires have certainly been developed in which the seating of the detachable tire is on the inside of the rim (DE-A No. 3,221,012, DE-A No. 3,2444,046, DE-A No. 3,246,131) so that it is possible to form an emergency running surface on the outer periphery of the rim; but this system is no less complicated than that common in practice, with the advantage of the greater design latitude being paid for with the disadvantage of poorer lateral guidance properties.

A tire unit is known (DE-A No. 3,206,171) in which the tire is made coreless. The forces acting in the tire in the meridional section in the peripheral direction and also the other operating forces are absorbed at the tire edge by the latter being permanently bonded to the rim rings which form the edge of a rim, with the direction of the bonding surfaces in the meridional section running rectalinearly in the direction in which the tire wall approximately runs clear of the rim edge. This uniformity of direction can also be present in a definite loading condition which occurs only by chance and for a short time, whereas under greater loading the tire side wall is buckled over the rim edge, or under lower loading a tensile stress directed at right angles to the bonding surface is exerted on the bond. As a result of the uncertain force conditions at the bond, the bond is insecure. Therefore this tire unit has been further developed (DE-A No. 3,343,890) in such a way that the bond is merely used for sealing, whereas the force transmission from the tire wall to the rim is effected by an indirect connection between the reinforcing ply of the tire wall and the rim. For example, carcass wires are welded to the rim. This is very expensive and also unreliable, because the exposed wires are subject to corrosion.

A tire unit is known (U.S. Pat. No. 4,274,465) in which the tire and the rim are firmly connected together. The rim edges are split fork-like in the meridional section to form a groove which accommodates the tire edge in clamping manner. For better mounting in the groove, the tire edge can have a bead with a steel core. It is impossible to imagine how the arrangement can obtain sufficient mechanical strength without such a bead. The cost of manufacturing the tire and the rim is on no account less than the cost of manufacturing conventional system. Assembly is extremely complicated. The operating behavior is disadvantageous because the tire wall is subjected to constant sharp bending in its area adjacent to the rim.

A further known tire unit (DE-Patent No. 2,445,969, FIG. 18) is manufactured by first fixing a reinforcing ply on the rim edge by means of an adhesive material and then in a mold into which these parts have seen inserted integrally molding therewith the parable tire material. The rim edges run out in a point in the meridional section, with the points lying in a center area of the mold cavity so that the flanks of the rim which run laterally to the point are enclosed by the liquid tire material which then solidifies thereon in an adhering manner. However, the force is not transmitted from the rim to the tire in the area of this flank connection but by the bonding, brought about separately beforehand, between the reinforcing ply and the rim. The rim edge running to a point in section, in the unloaded condition of the tire, points approximately in the direction in which the tire wall runs clear of the connecting zone. If the cross-sectional shape of the tire constantly changes during operation, locally high peak stresses occur which lead to the destruction of the tire material. This may be the reason why, in another embodiment (FIG. 19 of the same document), the rim is made substantially narrower than the tire and is not made pointed in cross-section. Yet on the one hand this does not eliminate the peak stresses in the transition area, and on the other hand the lateral guidance capacity of the tire is critically reduced. A great disadvantage of both embodiments is that they can be manufactured only by using a moldable material, which, however, has previously not been available in a quality which can be used for motor vehicles and at a moderate price.

Those known systems (U.S. Pat. Nos. 3,466,211, 3,719,219, GB-A No. 405,790) in which the reinforcing plies of the tire are bonded to rim parts which are embedded into the tire material in unloaded condition in the same direction as the tire side walls have the same disadvantages as the aforementioned embodiments.

The uncertainty associated with a bonded connection can be avoided by making the tire, including its reinforcing ply, enclosed in an annular shape in cross-section. For example, tire units are known (DE-A No. 2,347,609, GB-A No. 2,051,700) in which the tire closed tubelike in cross-section in an annular shape is bonded onto a rim bed. However, the manufacture of such a tire is expensive and the fixing on the rim bed is unreliable, because the bond at the rim edge lying on the outside when traveling round a curve is subjected to tensile loading at right angles to the bonding surface and can therefore work loose. Moreover, it is known to make a bond more secure by a mechanical anchorage being additionally provided by clamping the tire edges between two rim parts (FR-A No. 1,234,567) and if necessary welding the metal reinforcing plies to the rim (FR-A No. 81,585), but this results in substantially more expensive manufacture, and the reliability is not improved because of corrosion of the exposed reinforcing plies. For many reasons, therefore, it has hitherto not been possible to introduce bonded tire units in practice.

The object of the invention is to create a tire unit of the type mentioned at the beginning which under all operating conditions permits satisfactory force transmission between the tire and the rim despite having only a bonded connection, which provides considerable design latitude for the rim, makes use of production technology which is easy to cope with and/or permits the use of conventionally prepared tire materials and tire blanks.

The solution according to the invention is that the edges of the tire and of the rim are connected to one another solely by bonding, and the additional means are formed on the one hand by an undercut of the rim edge and on the other hand by an annular reinforcement of the tire edge interacting with the undercut, with the bond comprising a main bonding zone which is provided in the undercut and/or adjacent to it toward the tire side wall and in which the tangential angle to the axis is at no point smaller than at each point which lies closer to the tire side wall or smaller than the angle at which the tire side wall runs clear of the rim under all normal loading conditions, so that only positive normal forces in the main bonding zone are transmitted from the tire edge to the rim edge.

As a result of the specification of the angles in this solution, in no case, not even under the heaviest loading and preferably not even in emergency running, can loads occur which cause tensile stresses at right-angles to the bonding surface and which could lead to the tire material peeling off from the rim or even only to a load unfavourably composed of tensile and shearing stresses. On the contrary, a favorably composed load is created by an undercut being arranged in front of the main bonding zone on the side remote from the tire wall, in which undercut the tire edge lies with an annular reinforcement. The annular reinforcement is not to be understood in the sense of the high-tensile core in the bead of conventional tires. Its task is not to absorb by itself a substantial proportion of the stresses and to bring about a positively locking bond between the edges of the tire and the rim. Its strength and its modulus of elasticity are therefore also generally lower by several orders of magnitude than those of the conventional cores. They can therefore be formed, for example, from a somewhat more rigid type of the relevant cross-sectional area. Further examples are described further below. Their task is to superimpose compressive stresses, directed normal to the rim surface, on the shearing stresses which prevail in the adhesive and in the rubber material in the bonding zone between the rim surface and the reinforcing ply, which compressive stresses increase the resistance of the material to the shearing stresses.

It is particularly expedient if the rim surface is convexly curved in the meridional section in the area of the main bonding zone or the undercut, because force transmission effects ensue which have to be imagined by analogy with the theory of looping friction, according to which the force which can be transmitted increases exponentially with the angle of looping. This also results in the advantage that areas of the main bonding zone which are further from the tire are not put at risk if the bond should work loose in an area nearer the tire. In this connection, it can be expedient if the radius of curvature of the main bonding zone increases from its boundary on the tire side.

The term bonding, in the sense of the invention, comprises all connections, adhering in shear-resistant manner, between the tire material and the rim surface, irrespective of whether a third connecting material is used. It includes in particular the connection produced by vulcanizing the tire material to the rim surface.

An undercut is to be understood as such a surface part which forces a change in diameter on the tire edge becoming detached from it in the axial direction. In the case of an undercut which is arranged on the axis side of the rim, i.e., on the inside facing the axis, the diameter decreases when traveling towards the outside, i.e., away from the tire center plane. In the case of an undercut arranged on the tire side, i.e., on the side of the rim facing away from the axis side, the diameter increases in the corresponding direction.

The bond between the rim edge and the tire edge is contained completely or at least to a very considerable extent by the main bonding zone.

In comparing the site of the angles, it is assumed that, when the bonding zone is arranged on the rim on the axis side, those angles are positive whose sides formed by the tangent intersect the axis on that side of the point considered which is remote from the wheel center plane. Conversely, when the bonding zone is arranged on the tire side, those angles are positive whose sides formed by the tangent intersect with the axis on that side of the point considered which faces the wheel center plane.

It can be very expedient to provide a convexly curved supporting surface adjoining the bonding zone on the outside, with the tire side wall bearing in a curved shape against this supporting surface during normal loading. Consequently, when the tire configuration changes and therefore when the direction changes in which the tire side wall runs clear of the rim, the location of the tire side wall at which the latter just rests on the supporting surface and in which the tire material is squeezed during deformation does not always remain the same but travels over the supporting surface. Consequently, the deformation load on the tire side wall in this area is distributed over a larger area. A further advantage is that a shock-like tensile load on the tire side wall located in the meridional plane and caused by the looping friction at this surface is cushioned before it reaches the bonding zone protected in this manner. Simply rounding a rim edge, as may be known per se, is not sufficient to achieve this effect. On the contrary, the active section of the supporting surface in which the run-off point of the tire side wall can be located during normal alternating loading is to be at least approximately of the order of magnitude of the thickness of the tire side wall at this point.

A similar effect results if, according to the invention, the rim, on the outside adjacent to the bonding zone, has a supporting surface remote from the tire side wall during normal loading, with the intermediate space between the supporting surface the tire side wall expediently being elastically filled. This measure can also have advantages in production, namely when - as described in greater detail below - the tire is directly exposed to the heating medium during heating and the filling between the tire side wall and the supporting surface acts as a seal which protects the bonding zone from the heating medium.

If a gently curved supporting surface or a supporting filling is arranged, as described, in front of the main bonding zone, the main bonding zone can run rectilinearly in the meridional section.

The abovementioned annular stiffening is expediently harder than the tire material. But this is not absolutely necessary, because the reinforcing effect can also simply be based on a widening in the cross-section. It can also be composed of several layers of graded hardness. It is expediently covered by a thermal insulation and/or dissipating layer. It is expediently elastic so that it is easier to assemble. It can be made resilient—in particular when the bonding zone is arranged on the tire side of the rim—in order to ensure by pretensioning an adequate contact pressure in the bonding zone primarily during the vulcanizing process. In another embodiment, the reinforcing ring is formed from a material which is plastic during the lay-up of the tire and only hardens subsequently, for example a rubber mixture which can be vulcanized or a plastic resin. This simplifies the tire lay-up, because no allowance needs to be made for a predetermined length of the annular stiffening. Whereas the aforementioned embodiments are based on the assumption that the material lying in the undercut produces the reinforcing effect (at least for the most part) as a result of its greater hardness or thickness, in a further embodiment of the invention provision can be made for an additional reinforcing ring to be inserted after assembly of the tire and thus after complete or partial filling of the undercut, which secures the material lying in the undercut in position in the latter. Moreover, the parts of the tire edge which fill the undercut advantageously form a surface which faces the axis, is not undercut, is opened to the outside, for example cylindrically or slightly conically, and into which the reinforcing ring is pressed, with it being possible for it to be bonded to this surface.

The annular stiffening is expediently so rigid that it is also able to hold the tire on the rim if the bond should have worked loose completely in the bonding zone. As a result of the curvature of the bonding zone, the forces to be absorbed by the annular reinforcement in such a case re substantially lower than the forces acting in the tire wall. In many cases, however, a lower rigidity of the annular reinforcement can be satisfactory, because it is fairly certain that the bond cannot work completely loose.

It is generally expedient if the bonding zone is in each case provided only on one side of each rim edge. Bonding on the other side can be additionally provided, but the conditions set out above cannot then generally be maintained for this. According to a further feature of the invention, the rim can have a different diameter on its sides remote from and facing the vehicle, respectively, with the diameter of the rim being expediently smaller on its side remote from the vehicle. This is because the outside of the tire is generally stressed to a greater extent and is also subjected to a greater extent to damage caused by the curb. The smaller the rim diameter is here, the lower is the load and the risk of damage. A strong outer rubber coating can then also be selected with less disadvantage. On the inside, where the load and the risk of damage are less, a larger rim diameter can be selected in order to improve the lateral guidance qualities. As a result of the different size of the side walls, the tread in this embodiment is drawn outward from the center position, which leads to a sportly wide support of the vehicle and reduces the overload on the outside shoulder.

In this connection, it can be expedient if the bonding zone at the side of the rim remote from the vehicle is arranged radially toward the inside and on the other side radially toward the outside.

The invention assumes that a sufficiently firm connection is achieved between the rim surface and the reinforcing ply (cord) contained in the tire and imparting the tensile stress. In some cases, the reinforcing ply can only be connected directly to the rim surface. As a rule, however, this will at the same time concern built-up cord webs which consist of a plurality of cord threads which are arranged next to one another in parallel and are individually covered and held together in the form of a layer by an elastomeric material, in particular the tire material itself. The elastomeric covering has a thickness of a few tenths of a millimeter, for example 0.5 mm. The force therefore has to be transmitted from the rim surface to the reinforcing ply through the elastomeric layer which at the same time is subjected to a shearing load. According to a further feature of the invention, the force transmission can be improved by the surface of the rim being fluted in the bonding zone in the running direction of the threads (cord threads) forming the reinforcing ply, with the center spacings of the fluted grooves preferably being equal to those of the cord threads, and the cord threads lying at least for the most part in each case in a fluted groove. Consequently, for the force transmission to each individual thread of the reinforcing ply, a larger force transmission surface on the rim side is made available at a smaller spacing than would be possible in a smooth or randomly fluted rim surface. Moreover, the force transmission (including especially during annealing) can be improved by providing an excess of vulcanizing agent in the bonding zone.

A subsidiary problem of the invention is the configuration of the rim for running on a puncture. To this end, it is expediently proposed that the rim, between the shoulders used for holding the tire in place, should have an elevated bed as a supporting surface for running on a puncture, which elevated bed expediently, but not necessarily, forms a continuous unit. If the bonding zone is provided on the axis side of the rim, the rim edges, according to the invention, can also be used for forming an emergency-running supporting surface.

In the manufacture of known rimless tires, it is possible to supply the lay-up webs prefabricated as a blank, essentially in a flat configuration to the lay-up drum, from which results an approximately cylindrical configuration of the blank in the lay-up drum. The drum is equipped with devices which permit the tire blank to be cambered from the cylindrical shape when its bead edges are axially brought together. Such means can only be applied with difficulty in the manufacture of the tire unit according to the invention, because the rim has to be drawn into the lay-up device. In its areas forming the emergency running surfaces it has a larger diameter than in the areas provided for fixing the tire edge, so that the tire blank cannot be applied cylindrically with the small diameter of its edge to be fixed but has to have a larger diameter in its center part. The rim can also be a hindrance to the cambering means. As a subsidiary problem of the invention, the question concerning a suitable manufacturing process arises. This is characterized according to the invention in that the center part of the lay-up cord webs is pre-stretched in its longitudinal direction before reaching the lay-up drum, with the edges of the lay-up cord web expediently being firmly guided in such a way during the stretching that the side wall parts are also proportionately stretched. The center part is stretched beyond the elastic limit so that it does not reform again when it reaches the lay-up drum. The diameter of the tire edge border is expediently less than the bonding surface diameter so that the widened ring located at the tire edge border is pre-tensioned during assembly on the outside (tire side) of the rim, or during assembly on the axis side of the rim can be guided through the parts of smaller diameter and subsequently expanded.

The process according to the invention permits the use of conventional installations. Only the server for the supply of the prefabricated carcass ply and the lay-up drum have been changed. The carcass ply supplied expediently has all of the lay-up elements such as shoulder gussets, a side wall, several protected plies over a bonding zone, an edge bead for forming the annular reinforcement holding the tire edge in the undercut, and/or sealing strips for elastically filling the intermediate space between the supporting surface, adjoining the bonding zone on the outside, and the tire side wall. The ply is pre-stretched on the server, in which the two edges are fixed between rollers or between belts running over rollers. This can take place by a longer conveying path being provided for the center part than is provided for the side edges, for example by conveying rollers which have a smaller diameter in the area near the edge than in the center area. The bonding surfaces of the rim and/or of the lay-up cord web are expediently pre-heated so that a rapid bond and seal results. Moreover, provision can be made for the rubber cover of the cord in the bonding zone to be provided with an excess of vulcanizing agent for increasing its Shore hardness in order to thereby achieve a greater bonding strength and less deformation under the operating load. The excess of vulcanizing agent can be supplied, for example, by a covering layer, which rests on the lay-up cord web, or an edge fixing bead, which adjoins a covering layer and is used for forming the annular reinforcement, containing an excess of vulcanizing agent penetrating into the rubber cover of the cord.

If an unsplit rim is used, the cambering bellows have to be dispensed with for cambering in the mold. It can be replaced by an auxilliary tube introduced into the tire before connecting to the rim. For example, it is possible to place an auxilliary tube around the rim, which auxilliary tube is stretched considerably before assembly, is blown up for swelling and remains in the tire after heating or is removed via the openings. More advantageously, however, the cambering and/or heating medium act directly on the tire. To protect the tire material from the heating medium, a sealing layer of a medium-resistant material can be applied to the inner surface of the tire if desired—preferably including the sealing strip—for example sprayed on or calender-coated. When the cambering and/or heating medium are acting directly on the tire, the sealing strip between the supporting surface and the tire wall protects the bonding zone from the medium.

So that the bonding zone cannot work loose unintentionally, it can be expedient to pre-heat it before inserting the tire into the mold or even to pre-heat it first of all in the mold before the medium is supplied, for example by microwave radiation and/or inductively.

Good circulation of the heating medium through the tire can be achieved if two oppositely located holes are provided in the rim for the use of an automatic double connection for the admission and discharge of the heating medium. The heating medium can be of any type, for example, hot water, super-heated steam, gas (e.g. nitrogen).

Since the tire, from the lay-up drum on, is firmly connected to the rim, the unit can be handled entirely by taking hold of it by the rim. This avoids undesirable force effects on the tire blank. Holding the tire by the rim also results in considerable advantages after vulcanizing. All working steps, from the production of the blank through the technical control test of the blank with adjustments, spraying, preheating, heating, inserting the valves, gas filling, balancing and technical control test and adjustments, internal expansion, inspection (including gas tightness), stacking and dispatch up to the final assembly, can be carried out by holding the rim. This encourages possibilities of rationalization up to the fully automatic production process. In critical manufacturing phases in which the blank could be subjected to undesired deformation, for example during transport and interim storage between the tire lay-up machine and the heating press, the wheel can be turned about an essentially horizontal axis.

Concentricity and balancing errors are expediently corrected on the blank, since the fixed arrangement of the blank on the rim creates excellent preconditions for this.

Figure 6:
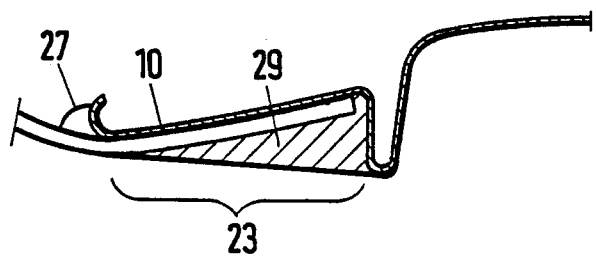
Figure 7:
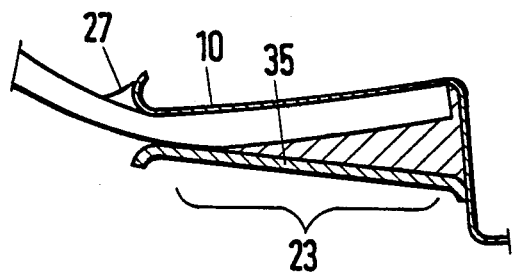
Figure 8:
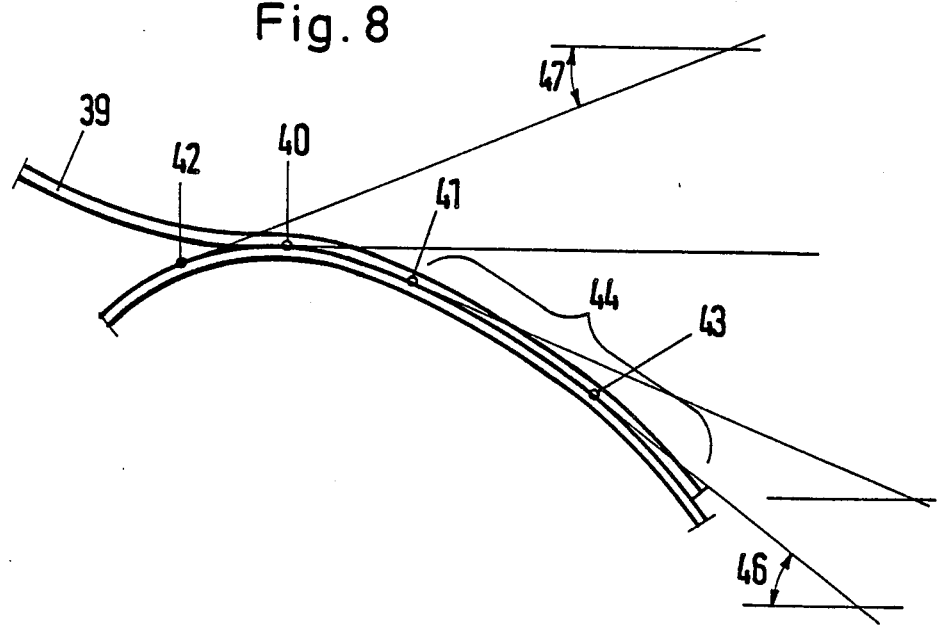
Figure 9:
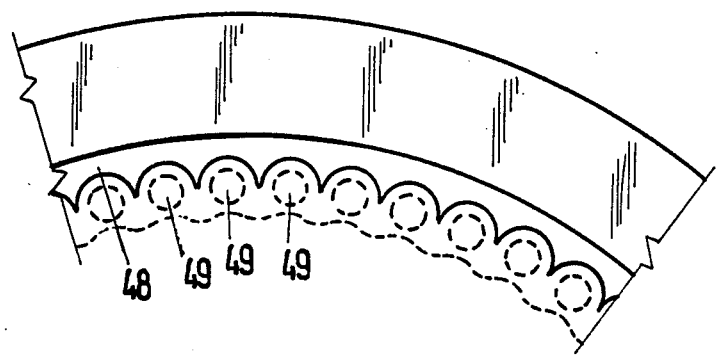
Figure 10:
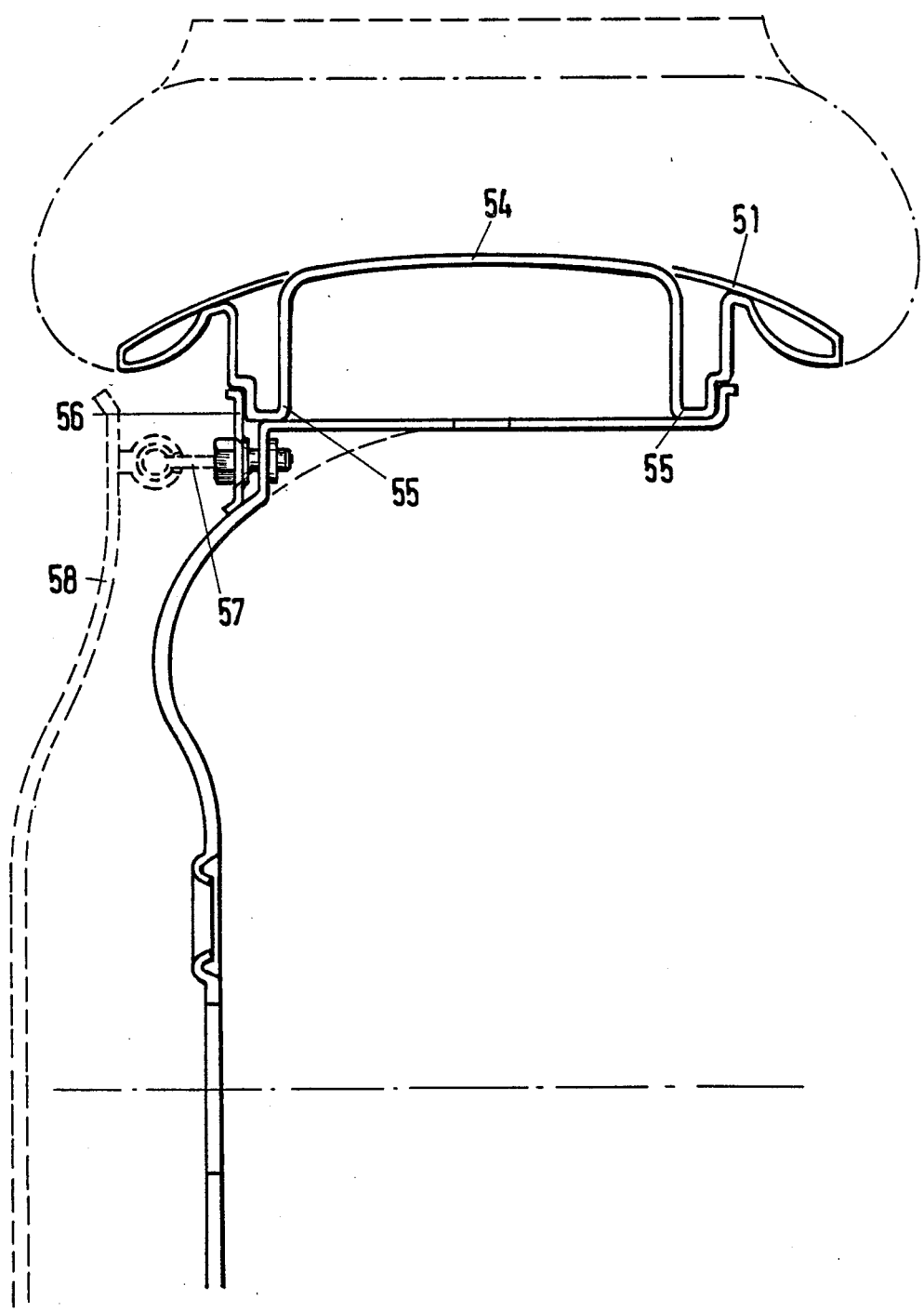
Figure 11:
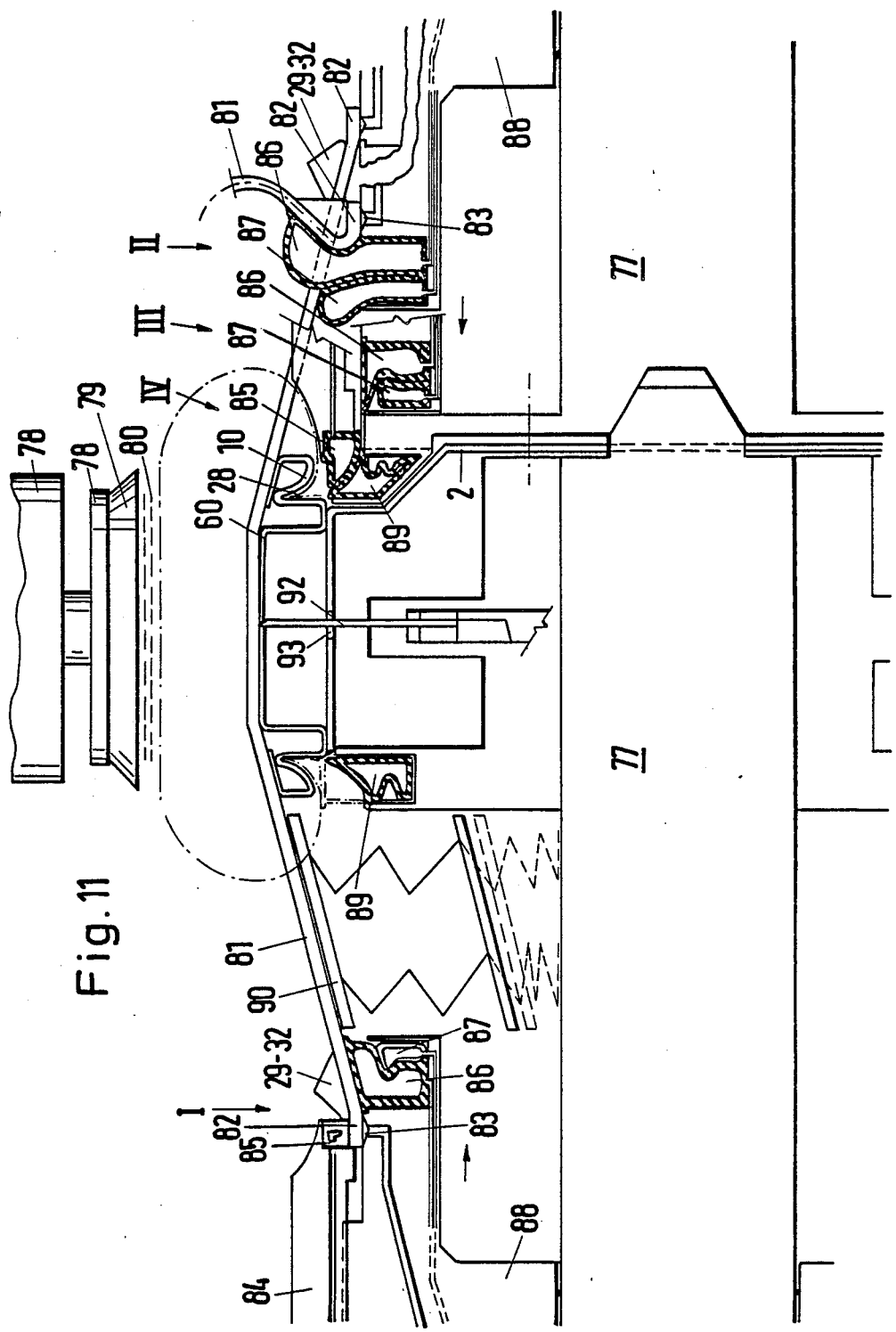
Figure 12:
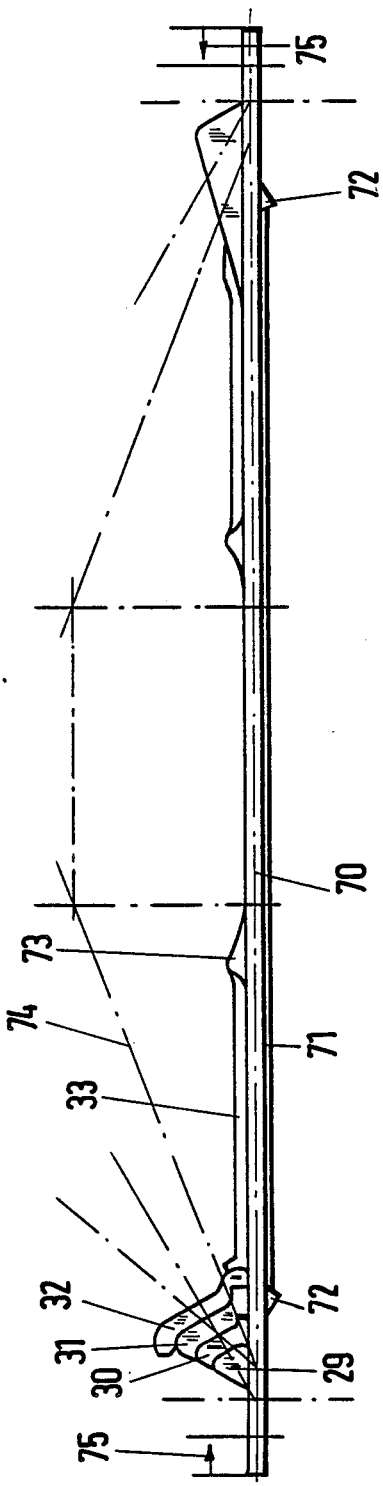
Figure 13:
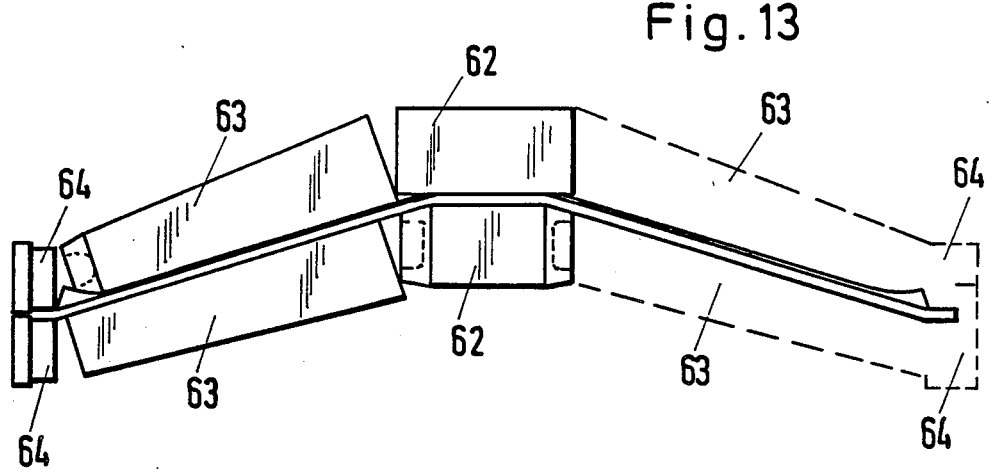
Figure 14:
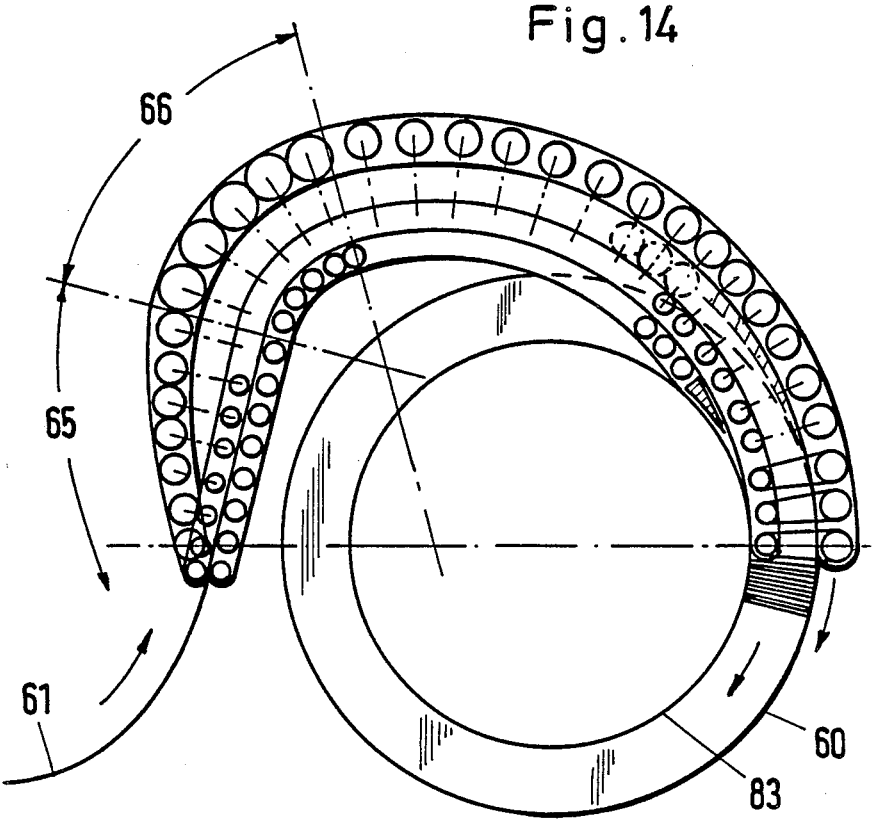

A vertical press (with horizontal wheel axis)—as known per se—can be used for the heating, which makes possible a compact heating press arrangement and rapid loading and unloading. The invention is described in greater detail below with reference to the drawing, which illustrates advantageous exemplary embodiments and in which:

FIG. 1 shows a meridional section through a tire unit (half),

FIGS. 2 to 7 show enlarged representations of the connecting area according to the left-hand embodiment in FIG. 1, with a bonding zone located on the axis side, in various embodiments and functional stages, FIG. 8 shows an enlarged, schematic representation of the connecting area appearing on the right in FIG. 1, with a bonding zone located on the tire side, FIG. 9 shows an enlarged cross-sectional representation of the connecting area with a fluted bonding surface on the rim, FIG. 10 shows a meridional section through a tire unit (half) modified compared with FIG. 1, FIG. 11 shows a longitudinal section through a lay-up drum, FIG. 12 shows a cross-section through a carcass ply with lay-up components, FIG. 13 shows a cross-section through the server in its area which approaches the drum, FIG. 14 shows a longitudinal section through the server.

The tire unit according to FIG. 1 relative to the axis 1 consists of the dish 2 which is welded to the rim 3 which supports the tire 4 which is shown as a radial-ply tire of low cross-section with a tread 5 and a side wall 6. It contains a reinforcing ply 7 consisting of cord threads. The tire edges 8 are connected to the rim edges 10 in the connecting area 9 by bonding. In the exemplary embodiment shown on the left in FIG. 1 the connection is on the axis side of the rim edge, whereas in the exemplary embodiment shown on the right it is arranged on the tire side of the rim edge. The rim contains a valve 11 which in practice is not required if the wheel is designed as a high-mileage tire system, the pressure loss of which is considerably reduced by the use of a large-molecular filler gas such as SF6. The rim 3 is expanded at 12 so that no water or dirt deposits can form in the hollow space of the rim and also to reduce the thermal effect of the brake disk 13 and disk brake set 14 on the rim, which forms a center elevated bed to permit non-destructive emergency running.

Figure 2:
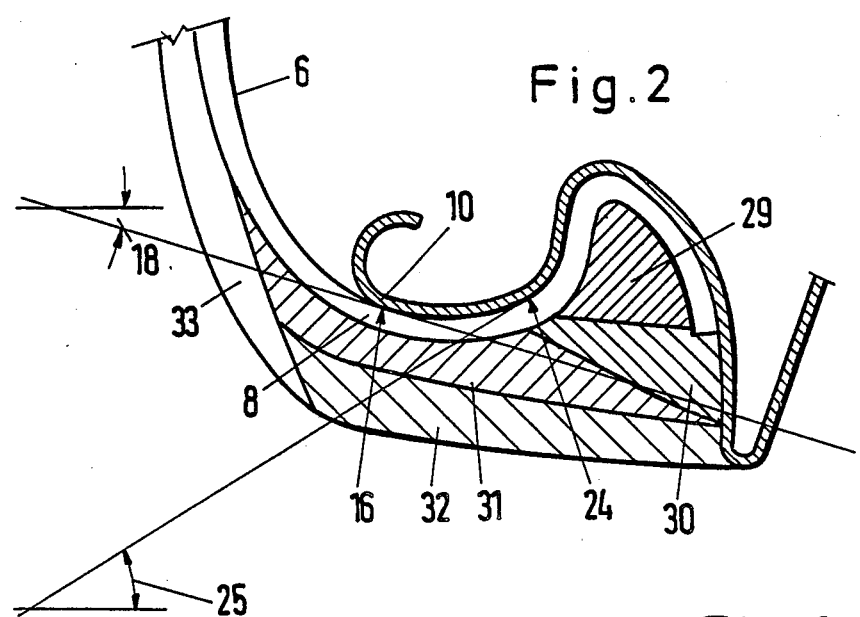
Figure 3:
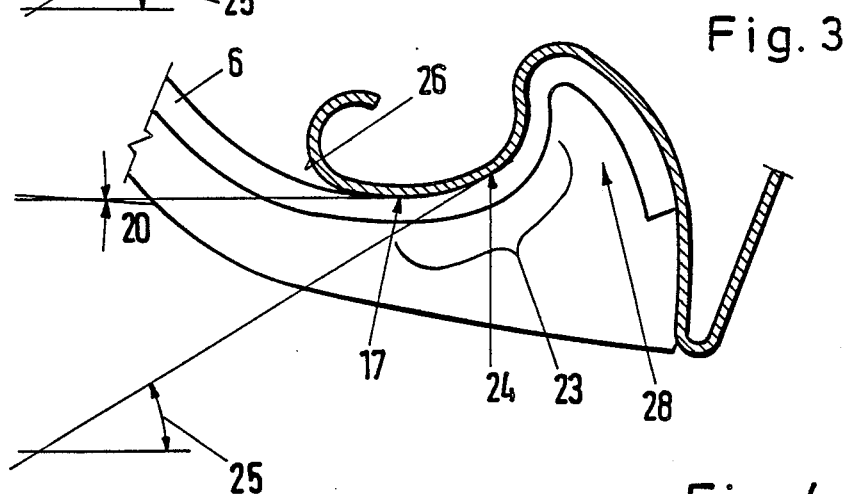
Figure 4:
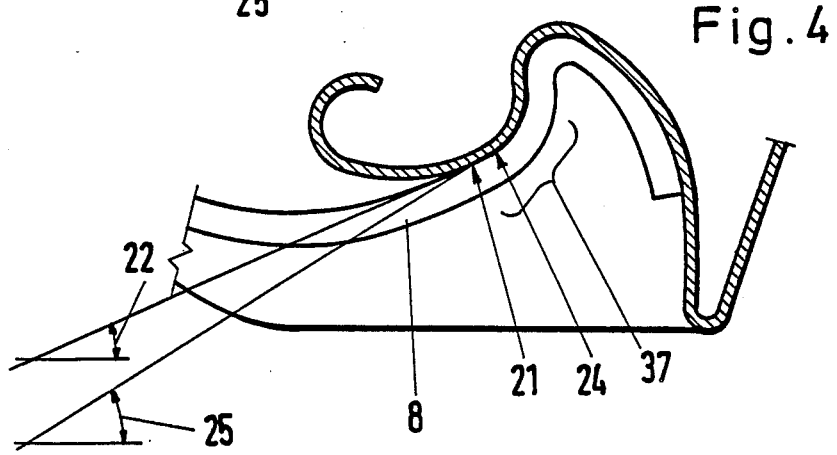

In the representation according to FIG. 1 it is assumed that the inner space of the unloaded tire is filled with compressed gas. If a radial force acts on the tire in the radial plane 15, the tread is pressed closer to the rim, which leads to corresponding deformation of the side wall. This deformation becomes extremely pronounced in the event of emergency running if the rim rests on the inside of the tread. The effect which this has in the connecting area is indicated in FIGS. 2 to 4, in which FIG. 2 shows the unloaded condition, FIG. 3 the loaded normal condition and FIG. 4 the emergency running condition. At the same time, it is assumed that the bond between the tire side wall 6 and the rim edge 10 is arranged in such a way or has worked loose to such an extent that the side wall can run tangentially clear of the rim edge in all these loading cases. In practice, this is generally not the case; but this approach is recommendable because it assumes the worst possible case when, after prolonged alternating loading on the outside, the bond has worked loose or is impaired. This case is also the basis for the specifications of the angles in claim 1.

In the unloaded normal condition according to FIG. 2, the run-off point is designated by the arrow 16. The tangent meeting the rim surface at this point approaches the axis toward the right. It therefore intersects the axis on the side of the point 16 facing the wheel center plane. The angle 18 which this tangent encloses with the axis is therefore negative according to the definition given above.

In the condition appearing according to FIG. 3, which is characterized by maximum loading, although this is still to be termed as normal, the run-off point 17, relative to the point 16, is moved further to the right. The corresponding angle 20 is slightly positive.

Finally, in emergency running according to FIG. 4, the run-off point 21 moves still further to the right. The associated angle is shown at 22.

In the calculation of the strength of the connection, a bond (not shown in the drawing) located outside of the run-off point 17 (i.e., to the left in the drawing) in the loaded normal condition cannot be expected. Therefore a zone 23 which can absorb a substantial proportion of the connecting forces, preferably all the connecting forces, is to be located on the other side of this point 17. This zone is designated as the main bonding zone. If any point 24 is selected in the main connecting zone 23, its tangent angle 25 is greater than the tangent angle 20 at the point 17 and greater than the angles pertaining to all points inbetween. This results in the material in the main bonding zone 23 being subjected to shearing stress and no tensile forces can occur at right angles to the bonding surface which under unfavourable conditions could lead to an impairment of the bonding quality.

The surface of the rim in the main bonding zone 23 is shaped convexly. This results in the force transmission being particularly intensive in this area.

In many cases, it is sufficient to determine the main bonding zone from the run-off point 17 at maximum, normal loading, namely when it is not to be expected that the tire will be used further after an emergency run, in which the bond could work loose to the right of the run-off point 17. However, if this is to be expected, it is necessary to provide the main bonding zone in the area 37 to the right of the run-off point 21 of the emergency-running case (FIG. 4) and to dimension it in such a way that it is able to transmit the necessary connecting forces.

On the tire side of the run-off point 16 or 17 or 21, the rim edge 10 forms a supporting surface 26 on which the tire side wall 6 can be supported during the alternating load and in particular also under the effect of axially directed forces as occur when travelling round a curve. This supporting surface 26 is configured in such a way that it forces only a slight curvature on a tire side wall abutting against it, so that the bending and pressing load remains limited and yet the lateral guidance forces, in particular the steering forces, are reliably transmitted.

Figure 5:
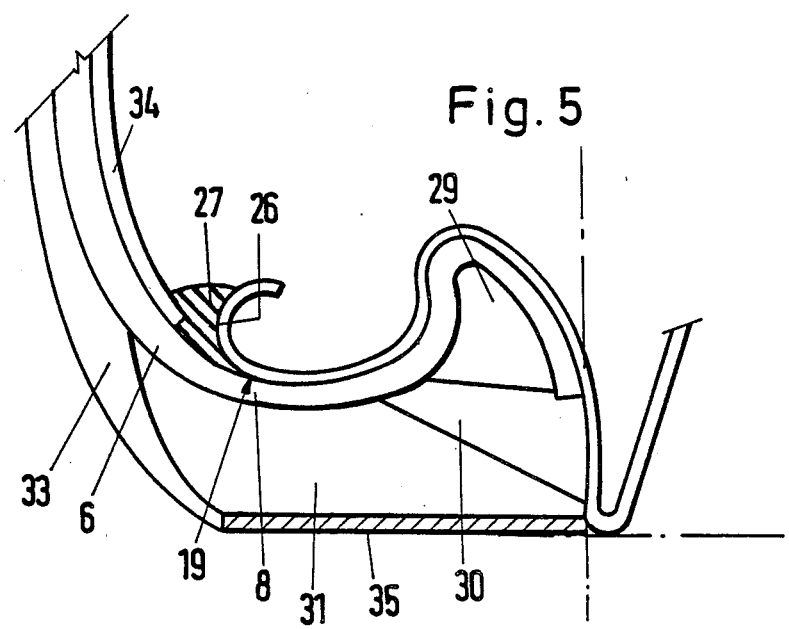

A bond between the tire side wall and the rim need not be dispensed with in this area. It is expediently made as indicated in FIG. 5, namely by a sealing strip 27 fitted in between the tire wall and the supporting surface 26. It forms a resilient transmission from the firm metal surface to the flexible tire side wall and improves the lateral guidance properties of the tire. Its elasticity is adapted to this function. It can also consist of zones of different hardness, for example a harder material in the gusset area than on its side facing the inner space of the tire. During the cambering and heating of the tire, it forms a seal between the rim and the tire relative to the medium to protect the bonding zone.

On the side facing the wheel center plane (on the right in FIGS. 2 to 4), the main bonding zone 23 and 37 runs into a neck 28 which is formed by the rim and, with its surface part on the left in FIGS. 2 to 4, participates in the formation of the main bonding zone. With respect to a direction parallel to the axis, it forms a deep undercut. To a lesser extent, the undercut also comprises the entire main bonding zone, since its diameter decreases from right to left. Inserted into the neck 28 is an annular rubber part 29 which consists of a holding mixture and has a higher Shore hardness compared with the rubber material of the tire side wall. It is used for holding the tire edge in the neck 28 and to support the bond in the main bonding zone 23 and 25 and also produces an emergency mounting if the bond in the strips 23 and 25 should become damaged.

The filling rubber strip 30 consists of a non-rigid mixture and is intended to compensate the tolerances. The strip 31 supports the transfer function of the sealing strip 27 from the other side by a more rigid mixture, whereas the strip 32 protects this zone from the effects of heat if the bonding zone is located on the rim side facing the axis. Adjoining these strips is the rubber coating 33 of the side wall. The upper inner surface of the layer 32 facing the axis expediently opens outward slightly conically in order to facilitate molding during the vulcanizing process. The inner rubber coating 34 (FIG. 6) ends at a tolerance distance in front of the main bonding zone inside the area 18 covered by the sealing strip 27. The build-up of the layers over the bonding zone in the exemplary embodiment according to FIG. 5 is essentially the same as that according to FIG. 2. Instead of the heat-resistant layer 32, a band-shaped metal ring 35 is provided which, apart from improving the heat dissipation, improves the strength of the part of the tire edge filling the undercut. In the example shown, it likewise opens outward slightly conically. But it can also be of a different shape.

In the alternative embodiments according to FIGS. 6 and 7, the undercut without a neck 28 is produced solely by appropriate inclination of the main bonding zone 23, the diameter of which decreases from the inside to the outside (from right to left). According to FIG. 6, the tire edge in the undercut is reinforced by the harder rubber layer 29. If shearing deformation is active in the main bonding zone, the annular reinforcement 29 is displaced in the direction of smaller diameters, is thereby set under compression in the peripheral direction and thus produces a force which acts radially outward, the component of which running normal to the bonding zone reinforces and supports the bond.

The embodiment according to FIG. 7 is the same as that according to FIG. 6, with the difference that the material of the tire edge filling the undercut is covered on the axis side by a metal ring 35 which reinforces this material in an annular shape.

In these embodiments according to FIGS. 6 and 7, the main bonding zone runs rectilinearly in the meridional section. Instead, it can also be curved convexly (as viewed from the axis side) in order to produce an even more reliable retaining effect.

The above comments on the embodiment with a connection located on the axis side from the rim edge (on the left in FIG. 1) unless stated otherwise below, can also be applied to the arrangement of the connection on the tire side (on the right in FIG. 1). The relevant angular ratios follow from FIG. 8.

From the rim edge 38, the tire side wall 39 runs off outwards at the run-off point 40 when the tire is deformed in accordance with the normal maximum load. In the unloaded condition or in the emergency-running condition, the run-off points are at 41 and 42 respectively. Adjoining the run-off point 41 to the right is the main bonding zone 44 and then the rim neck 45 (FIG. 1). If any point 43 is considered within the main bonding zone 44, it is found that its tangent forms an angle 46 with the direction of the axis, which is larger than the angle pertaining to the run-off points 41 and 40 and even more so than the negative angle 47 pertaining to the run-off point 42.

It is important that an adequate shear connection between the rim surface and the reinforcing ply 7 of the tire edge is achieved in the main bonding zone 23 and 44. This can be assisted by fluting the bonding surface on the rim side, and in fact preferably in the configuration according to FIG. 9 in which a fluted groove 48 is allocated in such a way to each cord thread 49 that the cord thread is only partly enclosed by the surface of the groove. The number and the position of the fluted grooves corresponds to that of the cord threads. The transitions of the fluted grooves can of course be rounded off.

FIG. 10 shows an example of a tire unit with a rim which can be removed from the wheel dish 2 and, owing to the cylindrical seating surfaces, is directionally neutral, i.e., it can be assembled on the left and on the right, for example with regard to a bond of the tire in the running direction. The rim has a wide emergency-running center elevated bed 54 and two shoulder low beds which are intended at the same time for emergency running and for supporting the tire in cases of special stressing, for example when running over a curb. The seating surfaces 55 of the rim and dish are provided with matching fluting so that a non-rotatable seat is achieved. The fixing part 56 can be a ring or can also be formed from individual claws which are assembled by means of bolts 57. The wheel cap 58 can be attached on the mounting 57. The dish can be removeable from the hub or preferably permanently connected to the hub.

As in known tires, the lay-up is expediently effected on a lay-up drum on which the tire edges are axially brought together during cambering.

In this process, it is expedient to take the rim, to which the tire edges have to be connected, into the lay-up drum, because otherwise the rim could only be inserted later into the tire blank already closed in an annular shape, which could lead to difficulties because of the necessary expansion and subsequent recontraction of a tire edge. FIG. 11 schematically shows a lay-up drum with a rim 60 which is accommodated in it and is already connected to the associated dish.

The edges of the tire blank are to have a diameter which is not greater than the diameter of the rim edge to which they are to be connected. However, since the rim has to have a larger diameter in other areas, it follows from this that the tire blank has to be applied to the lay-up drum in a form which is distinguished by a larger diameter in the center area of the tire blank than at its edges.

In order to make this possible, the server according to the invention illustrated in FIGS. 13 and 14 is provided. This consists of a lower and an upper roller conveyor which guide and form between them the lay-up web 61 of the tire. Each member of each of the two roller conveyors consists of several rollers, namely a center roller 62, two side rollers 63 and two edge rollers 64. If desired, conveyor belts can also run around each of the two roller conveyors. According to FIG. 13, the rollers are arranged in cross section in such a way that the lay-up web 61 guided between them or the conveyor belts is deformed in arched manner in cross section.

Moreover, since the server has a curved configuration (FIG. 14) in the longitudinal direction, this arching at the same time leads to stretching of the center part relative to the web edges, which are guided unstretched between the edge rollers 64. Whereas the lay-up web is guided essentially rectilinearly in a first section 65 of the server and is only arched in the transverse direction, in the following section 66 it covers a considerably curved distance in which the desired center stretching takes place. The radius of curvature in the section 66 is smaller than the radius of the layered drum. Overstretching thus takes place which in the adjoining section of the server, which in turn has a larger radius of curvature, is partly cancelled again by the elastic reforming. However, as a result of the over-stretching in the section 66, permanent deformation remains which enables the web to be supplied to the lay-up drum in the form assumed in FIG. 11. It should be noted in this connection that the arrangement shown assumes that the reinforcing ply of the lay-up web consists of transversely (later radially) running cord threads, the spacing of which, without stretching of the threads themselves, can be increased by the stretching carried out in the server. Of course, the lay-up drum and the server are driven synchronously, and if necessary a small pretension of the lay-up web on the drum can be achieved by the drum being driven slightly faster than the server.

In FIG. 12, a prefabricated carcass ply is shown in cross-section. Beneath the cord web 70 is located an inner covering layer (inner liner) 71, e.g. made of butyl rubber, which is defined at the sides by profiles 72 which later form the sealing strip 27. Applied to the upper side are the filling rubbers 29-32 (left hand side) which adjoin the side wall mixture 33 which ends toward the center at the gussets 73. The chain-dotted line 74 shows the profile with which the lay-up web stretched in the center runs out of the server, whereas the arrows 75 indicate the lateral shortening connected with the profiling.

The lay-up operation, including the devices required for it, are explained below with reference to FIG. 11.

The main shaft 77 of the single-stage lay-up machine is separable in the area of the wheel dish 2 and fixes and centers the wheel in this location. The transfer ring 8 holds the tread 79 and the belt 80 above the center line of the rim. The lay-up web 81 pre-profiled according to FIG. 12, with its edges 82, lies in the drum area of a vacuum suction device 83. The edges are additionally secured in position by means of the pusher ring 84 and the swelling bead 85. Both are located together with the push-over bellows 86 and 87 on the displaceable drum part 8. Between the latter and the shoulder press bellows 89 is located a drum segment 90 which in particular permits an abuttment of the lay-up web 81 and is collapsible inwards. These parts are shown in their initial position in the area I on the left in FIG. 11.

The second phase of the process is indicated in the area II on the right in FIG. 11. The drum part 88 has been moved some distance towards center, with the push-over bellows 86 and 87 turning the lay-up web 81, with filling rubber bead 29-32, over the tip of the latter by about 120°.

In the last phase of this turnover operation, when a turnover angle of about 90° is reached, the pusher ring 84 returns in order to press, once the turnover operation is complete, against the side of the filling rubber 29-32 facing it.

The drum part 88 now travels into the position III, with the bellows 86 and 87 being contracted to form a cylindrical guide surface.

When the pusher ring 84 is displaced further towards the center, the edge 82 of the tire blank is pushed over this guide surface. When it has reached the slope of the shoulder press bellows 89, it is pressed outward into the final position into the neck 28 of the rim and against the bonding surface of the rim edge 10. The swelling bead 85 assists this by a corresponding swivel movement (position IV).

The pusher ring 84 then returns and the shoulder press bellows 89 exerts an increased force the filling rubber 29-32 with the cord web 81 to such an extend that the increased internal pressure of the tire, in the zone of the belt 80, connects the cord web 81 to the belt 80. During this procedure, the compressed air is fed to the tire space via a double feed 92 and 93. The feed 92 can be retracted and extended. The tire blank is then ready and can be removed and conveyed further.

I claim:
1. A tire unit comprising:
a wheel having a circumferential rim (3) for rotation about a wheel axis (1), the rim having axially outer edges (10) on either side of a radial plane (15) which is perpendicular to the wheel axis, each rim edge having an axially outer tire support surface (26) and an adjacent tire interface surface including an axially inner undercut (28) as the rim is viewing in a direction parallel to the wheel axis (1);
a coreless air tire (4) unreleasably secured to the rim and including two annular edges located on either side of said radial plane and confronting the tire interface surface of the rim edge, a tread spaced from the rim and extending substantially parallel to the wheel axis (1), and tire side walls extending between the tire edges and the tread;
a main bonding connection (23), for transmitting operating forces from the tire to the rim, in which at least a portion of a tire edge is bonded to a respective tire interface surface on the rim, wherein all points (24) included by the bonding connection have a tangent forming an angle (25) to the wheel axis (1) that is no smaller than the angle of the tangent to the interface surface at any point which lies closer to the support surface, or is smaller than the angle (20) between the tire wall (6) and the wheel axis (1) at the innermost point (17) at which the tire side wall (6) is spaced from the rim edge (10), under all normal loading conditions, so that only positive normal forces in the bonding connection are transmitted from the tire edge to the rim edge; and
annular reinforcement means (29) carried by the tire edge and interacting with the undercut (28), for reinforcing the bonding connection, said annular reinforcement means including a portion filling the undercut (28), said portion consisting of nonmetallic deformable material.

2. The tire unit of claim 1, wherein the side wall is made of rubber and the reinforcement means has a higher Shore hardness than the rubber material of the tire side wall.

3. The tire unit of claim 1, wherein the reinforcement means maintains the tire side wall in a compressive relation normal to the tire interface surface of the rim along the bonding connection.

4. The tire unit as claimed in claim 1, wherein the tire edge (8) is arranged only on the side of the rim edge (10) facing the axis (1).

5. The tire unit as claimed in claim 1, wherein said angle (25) is not smaller than the angle (22) at which the tire side wall (6) is spaced from the rim edge (10) during emergency running.

6. The tire unit as claimed in claim 1, wherein at least the main bonding connection (23) is curved convexly in the meridional section.

7. The tire unit as claimed in claim 1, wherein a convexly curved supporting surface (26) spaced from the tire side wall during normal loading is provided on the rim edge (10) to the outside of the main bonding connection (23).

8. The tire unit as claimed in claim 7, wherein the space between the supporting surface (26) and the tire side wall (6) is elastically filled.

9. The tire unit as claimed in claim 1, wherein the annular reinforcement means (29) comprises a material which is plastic during the lay-up of the tire and then hardens.

10. The tire unit as claimed in claim 1, wherein the annular reinforcement means (29) further includes a reinforcing ring (35) which is secured to the tire edge after assembly of the tire.

11. The tire unit as claimed in claim 10, wherein a part of the tire edge (8) filling the undercut (28) forms a surface which faces the axis and is not undercut, and the reinforcing ring (35) rests on this surface.

12. The tire unit as claimed in claim 1, wherein the rim has a different diameter on its side remote from or facing the vehicle.

13. The tire unit as claimed in claim 1, wherein the reinforcing ply includes cord threads (45) and the tire interface surface of the rim in the main bonding connection (23) is fluted with grooves (48) in the running direction of the cord threads (49), and has the cord threads of the tire edge (8) connected to the tire interface surface, and the center spacings and the directions of the grooves (48) are equal to those of the cord threads and a substantial number of cord threads lie in the fluted grooves.

14. The tire unit as claimed in claim 1, wherein the rim is equipped with at least one shoulder including an elevated supporting surface (51) for running on a puncture.

15. A method for manufacturing a tire unit using a lay-up drum, the tire unit including a wheel having a circumferential rim (3) for rotation about a wheel axis (1), the rim having axially outer edges (10) on either side of a radial plane (15) which is perpendicular to the wheel axis, each rim edge having an axially outer tire support surface (26) and an adjacent tire interface surface including an axially inner undercut (28) as the rim is viewed in a direction parallel to the wheel axis (1); a coreless air tire (4) unreleasably secured to the rim and including two annular edges located on either side of said radial plane and confronting the tire interface surface of the rim edge, a tread spaced from the rim and extending substantially parallel to the wheel axis (1), and tire side walls extending between the tire edges and the tread; a main bonding connection (23), for transmitting operating forces from the tire to the rim, in which at least a portion of a tire edge is bonded to a respective tire interface surface on the rim, wherein all points (24) included by the bonding connection have a tangent forming an angle (25) to the wheel axis (1) that is no smaller than the angle of the tangent to the interface surface at any point which lies closer to the support surface, or is smaller than the angle (20) between the tire wall (6) and the wheel axis (1) at the innermost point (17) at which the tire side wall (6) is spaced from the rim edge (10), under all normal loading conditions, so that only positive normal forces in the bonding connection are transmitted from the tire edge to the rim edge; and annular reinforcement means (29) carried by the tire edge and interacting with the undercut (28), for reinforcing the bonding connection, said annular reinforcement means including a portion filling the undercut (28), said portion consisting of nonmetallic deformable material;

said method comprising the steps of:

selecting a prefabricated substantially flat tire carcass having said annular reinforcing means preformed thereon on at least one of the carcass edges;

prestretching the center portion of the carcass between the edges in the longitudinal direction before the carcass reaches the lay-up drum;

securing the carcass to the lay-up drum;

securing the wheel in the lay-up drum;

cambering the carcass on the lay-up drum with the edges of the carcass approaching each other along the wheel axis whereby the carcass is connected to the rim to form a tire unit blank; and introducing a heating medium into the tire unit blank.

16. The method of claim 15, wherein the tire carcass includes a cord which is covered by rubber in the main bonding connection, and the method includes the step of providing the cover with ingredients for increasing the Shore hardness of the cover in the main bonding connection when the heating medium is introduced.

17. The method of claim 15, wherein the heating medium is introduced directly into the tire unit blank.

18. The method of claim 15, wherein the heating medium is introduced into the tire unit blank indirectly by providing a thin auxilliary tube around the rim before the carcass is secured to the lay-up drum, and expanding and filling the tube with the heating medium.

19. The method of claim 15, including the step of preheating the main bonding connection before the introduction of the heating medium into the tire unit blank.

* * * * *